US011081078B2

(12) United States Patent
Zhao et al.

(10) Patent No.: US 11,081,078 B2
(45) Date of Patent: Aug. 3, 2021

(54) COMMON VOLTAGE COMPENSATION CIRCUIT UNIT, DISPLAY PANEL, DISPLAY DEVICE, AND COMMON VOLTAGE COMPENSATION METHOD FOR DISPLAY PANEL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jian Zhao, Beijing (CN); Huanyu Li, Beijing (CN); Mo Chen, Beijing (CN); Jilei Gao, Beijing (CN); Yang Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 501 days.

(21) Appl. No.: 16/087,280

(22) PCT Filed: Jan. 4, 2018

(86) PCT No.: PCT/CN2018/070743
§ 371 (c)(1),
(2) Date: Sep. 21, 2018

(87) PCT Pub. No.: WO2018/205653
PCT Pub. Date: Nov. 15, 2018

(65) Prior Publication Data

US 2021/0183329 A1 Jun. 17, 2021

(30) Foreign Application Priority Data

May 10, 2017 (CN) ......................... 201710326260.1

(51) Int. Cl.
*G09G 3/36* (2006.01)
*G06F 3/038* (2013.01)
*G09G 5/00* (2006.01)
*G09G 5/10* (2006.01)
*G09G 3/20* (2006.01)

(52) U.S. Cl.
CPC ......... *G09G 3/3696* (2013.01); *G09G 3/2092* (2013.01)

(58) Field of Classification Search
CPC .......................... G09G 3/3655; G09G 3/3696
See application file for complete search history.

(56) References Cited

U.S. PATENT DOCUMENTS

2006/0145995 A1* 7/2006 Kim ..................... G09G 3/3655 345/98
2007/0024565 A1* 2/2007 Choi .................... G09G 3/3655 345/98

* cited by examiner

*Primary Examiner* — Nan-Ying Yang
(74) *Attorney, Agent, or Firm* — Calfee, Halter & Griswold LLP

(57) ABSTRACT

A common voltage compensation circuit unit including a trigger signal terminal, a common voltage output terminal, a design common voltage signal terminal, a power signal terminal, a compensation common voltage signal terminal, a reset signal terminal, a clock signal terminal, a trigger signal input sub-circuit, a first output sub-circuit, a control sub-circuit, a second output sub-circuit, and a reset sub-circuit. The present disclosure further provides a display panel, a display device, and a common voltage compensation method for a display panel.

20 Claims, 3 Drawing Sheets

COMMON VOLTAGE COMPENSATION CIRCUIT UNIT, DISPLAY PANEL, DISPLAY DEVICE, AND COMMON VOLTAGE COMPENSATION METHOD FOR DISPLAY PANEL

CROSS REFERENCE TO RELATED APPLICATIONS

The present application is the U.S. national phase entry of PCT/CN2018/070743, with an international filing date of Jan. 4, 2018, which claims the priority to Chinese Patent Application No. 201710326260.1, filed on May 10, 2017, the entire disclosures of which are incorporated herein by reference.

TECHNICAL FIELD

The present disclosure relates to the field of display apparatuses, and specifically to a common voltage compensation circuit unit, a display panel comprising the common voltage compensation circuit unit, a display device, and a common voltage compensation method that utilizes the common voltage compensation circuit unit.

BACKGROUND

With the development of display technologies, higher and higher requirements have been put on image quality of liquid crystal display panels. Typically, each of the pixel units in a liquid crystal display panel includes a pixel electrode and a common electrode. The electric field formed between the pixel electrode and the common electrode is used to control the deflection of liquid crystal molecules in the pixel unit. However, voltage variations on the liquid crystal display panel will generate voltage residues due to the presence of parasitic capacitance or storage capacitance. The voltage residues will affect the accuracy of the display voltages, leading to artifacts and thus affected image quality.

Therefore, how to eliminate the artifacts has become a technical problem to be solved in the art.

SUMMARY

The present disclosure provides an improved common voltage compensation circuit unit, a display panel comprising the common voltage compensation circuit unit, a display device, and a common voltage compensation method that utilizes the common voltage compensation circuit unit.

According to an exemplary embodiment of the present disclosure, there is provided a common voltage compensation circuit unit, comprising a trigger signal terminal, a common voltage output terminal, a design common voltage signal terminal, a power signal terminal, a compensation common voltage signal terminal, a reset signal terminal, a clock signal terminal, a trigger signal input sub-circuit, a first output sub-circuit, a control sub-circuit, a second output sub-circuit, and a reset sub-circuit.

An input terminal of the trigger signal input sub-circuit is electrically connected to the trigger signal terminal, and an output terminal of the trigger signal input sub-circuit is electrically connected to a first node. The trigger signal input sub-circuit is configured to, in response to receiving a first level signal at the input terminal of the trigger signal input sub-circuit, bring the input terminal of the trigger signal input sub-circuit into conduction with the output terminal of the trigger signal input sub-circuit;

An input terminal of the first output sub-circuit is electrically connected to the compensation common voltage signal terminal, and a control terminal of the first output sub-circuit is electrically connected to the first node, an output terminal of the first output sub-circuit is electrically connected to the common voltage output terminal. The first output sub-circuit is configured to, in response to receiving a third level signal at the control terminal of the first output sub-circuit, bring the input terminal of the first output sub-circuit into conduction with the output terminal of the first output sub-circuit, wherein an absolute value of the third level signal is greater than or equal to an absolute value of the first level signal, and the third level signal and the first level signal have a same polarity;

A first control terminal of the control sub-circuit is electrically connected to the clock signal terminal, a second control terminal of the control sub-circuit is electrically connected to a second output terminal of the reset sub-circuit, a first input terminal of the control sub-circuit is electrically connected to the clock signal terminal, a second input terminal of the control sub-circuit is electrically connected to the trigger signal terminal, a first output terminal of the control sub-circuit is electrically connected to the first node, and a second output terminal of the control sub-circuit is electrically connected to a second node. The control sub-circuit is configured to, in response to receiving the first level signal at the first control terminal of the control sub-circuit, bring the second input terminal of the control sub-circuit into conduction with the first output terminal of the control sub-circuit, and in response to receiving a second level signal at the second control terminal of the control sub-circuit, disconnect the first input terminal of the control sub-circuit from the second output terminal of the control sub-circuit;

A first control terminal of the second output sub-circuit is electrically connected to the second node, a second control terminal of the second output sub-circuit is electrically connected to the reset signal terminal, a third control terminal of the second output sub-circuit is electrically connected to the clock signal terminal, an input terminal of the second output sub-circuit is electrically connected to the design common voltage signal terminal, and an output terminal of the second output sub-circuit is electrically connected to the common voltage output terminal. The second output sub-circuit is configured to, in response to receiving the first level signal at least one of the first control terminal, the second control terminal, or the third control terminal of the second output sub-circuit, bring the input terminal of the second output sub-circuit into conduction with the output terminal of the second output sub-circuit;

A first control terminal of the reset sub-circuit is electrically connected to the reset signal terminal, a second control terminal of the reset sub-circuit is electrically connected to the second node, a third control terminal of the reset sub-circuit is electrically connected to the first node, an input terminal of the reset sub-circuit is electrically connected to a power signal terminal, a first output terminal of the reset sub-circuit is electrically connected to the first node, and a third output terminal of the reset sub-circuit is electrically connected to the second node. The reset sub-circuit is configured to, in response to receiving the first level signal at at least one of the first control terminal or the second control terminal of the reset sub-circuit, bring the input terminal of the reset sub-circuit into conduction with the first output terminal of the reset sub-circuit, and in response to receiving the first level signal at the third control terminal of the reset sub-circuit, bring the input terminal of the reset sub-circuit into conduction with the second output terminal and the third output terminal of the reset sub-circuit.

According to some embodiments, the trigger signal input sub-circuit comprises a trigger input transistor. A first terminal of the trigger input transistor is electrically connected to the input terminal of the trigger signal input sub-circuit, and a second terminal of the trigger input transistor is electrically connected to the output terminal of the trigger signal input sub-circuit.

According to some embodiments, the first output sub-circuit comprises a display output transistor and a storage capacitor. A control terminal of the display output transistor is electrically connected to the control terminal of the first output sub-circuit, a first terminal of the display output transistor is electrically connected to the compensation common voltage signal terminal, and a second terminal of the display output transistor is electrically connected to the common voltage output terminal. A first terminal of the storage capacitor is electrically connected to the first node, and a second terminal of the storage capacitor is electrically connected to the output terminal of the first output sub-circuit.

According to some embodiments, the control sub-circuit comprises a first control transistor, a second control transistor, and a third control transistor. A control terminal of the first control transistor is electrically connected to the first control terminal of the control sub-circuit, a first terminal of the first control transistor is electrically connected to the second input terminal of the control sub-circuit, and a second terminal of the first control transistor is electrically connected to the first output terminal of the control sub-circuit. A control terminal of the second control transistor is electrically connected to the first input terminal of the control sub-circuit, and a second terminal of the second control transistor is electrically connected to the second control terminal of the control sub-circuit connection. A control terminal of the third control transistor is electrically connected to the second control terminal of the control sub-circuit, a first terminal of the third control transistor is electrically connected to the first input terminal of the control sub-circuit, and a second terminal of the third control transistor is electrically connected to the second output terminal of the control sub-circuit.

According to some embodiments, the reset sub-circuit comprises a first reset transistor, a second reset transistor, a third reset transistor, and a fourth reset transistor. A control terminal of the first reset transistor is electrically connected to the second control terminal of the reset sub-circuit, a first terminal of the first reset transistor is electrically connected to the input terminal of the reset sub-circuit, and a second terminal of the first reset transistor is electrically connected to the first output terminal of the reset sub-circuit. A control terminal of the second reset transistor is electrically connected to the first control terminal of the reset sub-circuit, a first terminal of the second reset transistor is electrically connected to the input terminal of the reset sub-circuit, and a second terminal of the second reset transistor is electrically connected to the first output terminal of the reset sub-circuit. A control terminal of the third reset transistor is electrically connected to the third control terminal of the reset sub-circuit, a first terminal of the third reset transistor is electrically connected to the input terminal of the reset sub-circuit, and a second terminal of the third reset transistor is electrically connected to the second output terminal of the reset sub-circuit. A control terminal of the fourth reset transistor is electrically connected to the third control terminal of the reset sub-circuit, a first terminal of the fourth reset transistor is electrically connected to the input terminal of the reset sub-circuit, and a second terminal of the fourth reset transistor is electrically connected to the third output terminal of the reset sub-circuit.

According to some embodiments, the second output sub-circuit comprises a first reset output transistor, a second reset output transistor, and a third reset output transistor. A control terminal of the first reset output transistor is electrically connected to the second control terminal of the second output sub-circuit, a first terminal of the first reset output transistor is electrically connected to the input terminal of the second output sub-circuit, and a second terminal of the first reset output transistor is electrically connected to the output terminal of the second output sub-circuit. A control terminal of the second reset output transistor is electrically connected to the third control terminal of the second output sub-circuit, a first terminal of the second reset output transistor is electrically connected to the input terminal of the second output sub-circuit, and a second terminal of the second reset output transistor is electrically connected to the output terminal of the second output sub-circuit. A control terminal of the third reset output transistor is electrically connected to the first control terminal of the second output sub-circuit, a first terminal of the third reset output transistor is electrically connected to the input terminal of the second output sub-circuit, and a second terminal of the third reset output transistor is electrically connected to the output terminal of the second output sub-circuit.

According to another exemplary embodiment of the present disclosure, there is provided a display panel comprising a plurality of cascaded common voltage compensation circuit units as described above, a plurality of gate lines, a plurality of common electrode lines, a first clock signal line, a second clock signal line, a power signal line, a design common voltage signal line, and a compensation common voltage signal line.

The common voltage output terminal of each of the common voltage compensation circuit units is electrically connected to a corresponding one of the common electrode lines, the trigger signal terminal of each of the common voltage compensation circuit units is electrically connected to a corresponding one of the gate lines, the reset signal terminal of each of the common voltage compensation circuit units is electrically connected to another corresponding one of the gate lines, the power signal terminal of each of the common voltage compensation circuit units is electrically connected to the power signal line, the design common voltage signal terminal of each of the common voltage compensation circuit units is electrically connected to the design common voltage signal line, and the compensation common voltage signal terminal of each of the common voltage compensation circuit units is electrically connected to the compensation common voltage signal line.

When the common voltage compensation circuit unit corresponds to an odd-row common electrode line, the clock signal terminal of the common voltage compensation circuit unit is electrically connected to the first clock signal line; when the common voltage compensation circuit unit corresponds to an even-row common electrode line, the clock signal terminal of the common voltage compensation circuit unit is electrically connected to the second clock signal line;

The compensation common voltage signal line is electrically connected to a common voltage generating chip configured to provide a design common voltage signal to the compensation common voltage signal line in response to the first clock signal line or the second clock signal line connected to the clock signal terminal of the common voltage compensation circuit unit providing the first level signal, and provide a compensation common voltage signal to the compensation common voltage signal line in response to the first clock signal line or the second clock signal line connected to the clock signal terminal of the common voltage compensation circuit unit providing the second level signal.

According to some embodiments, the display panel comprises multiple rows of pixel units, each row of pixel units comprises a plurality of pixel units, and the multiple rows of pixel units are in one-to-one correspondence with multiple rows of common electrodes.

The common voltage generating chip is configured to calculate the compensation common voltage signal according to Formula (1) and Formula (2):

$$ComN - Com'N = \Delta Vp \tag{1}$$

$$\Delta Vp = \frac{(Vgh - Vgl) * Cgd}{Cgd + Cs + Clc} \tag{2}$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the N-th row of pixel units;

Cs is a storage capacitance of the pixel unit; and

Clc is a liquid crystal capacitance of the pixel unit.

According to some embodiments, the common electrode lines are in one-to-one correspondence with the common voltage compensation circuit units.

According to yet another exemplary embodiment of the present disclosure, there is provided a display device comprising the display panel as described above.

According to yet another exemplary embodiment of the present disclosure, there is provided a common voltage compensation method for a display panel, utilizing the common voltage compensation circuit unit as described above. The method comprises an input phase, a display output phase, and a reset phase.

In the input phase, the first level signal is input from the trigger signal terminal, the second level signal is input from the clock signal terminal, the second level signal is input from the reset signal terminal, and the design common voltage signal is input from the compensation common voltage signal terminal;

In the display output phase, the second level signal is input from the trigger signal terminal, the second level signal is input from the clock signal terminal, and the compensation common voltage signal is input from the compensation common voltage signal terminal.

In the reset phase, the first level signal is input from the clock signal terminal, the second level signal is input from the trigger signal terminal, the first level signal is input from the reset signal terminal, and the design common voltage signal is input from the design common voltage signal terminal.

According to some embodiments, the compensation common voltage signal is calculated according to Formula (1) and Formula (2):

$$ComN - Com'N = \Delta Vp \tag{1}$$

$$\Delta Vp = \frac{(Vgh - Vgl) * Cgd}{Cgd + Cs + Clc} \tag{2}$$

wherein ComN is a voltage value of a design common voltage signal for an N-th row of pixel units corresponding to the common voltage compensation circuit unit;

Com'N is a voltage value of a compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the pixel units of the N-th row;

Cs is a storage capacitance of the pixel unit; and

Clc is a liquid crystal capacitance of the pixel unit.

BRIEF DESCRIPTION OF THE DRAWINGS

The accompanying drawings are intended to provide a further understanding of the present disclosure and constitute a part of the specification, which together with specific embodiments below are used for illustrating, instead of limiting, the present disclosure. In the drawing.

DETAILED DESCRIPTION

Specific embodiments of the present disclosure will be described in detail below with reference to the accompanying drawings. It is to be understood that the specific embodiments described herein are only intended to illustrate and explain the present disclosure, rather than limit the present disclosure.

Figure 1:
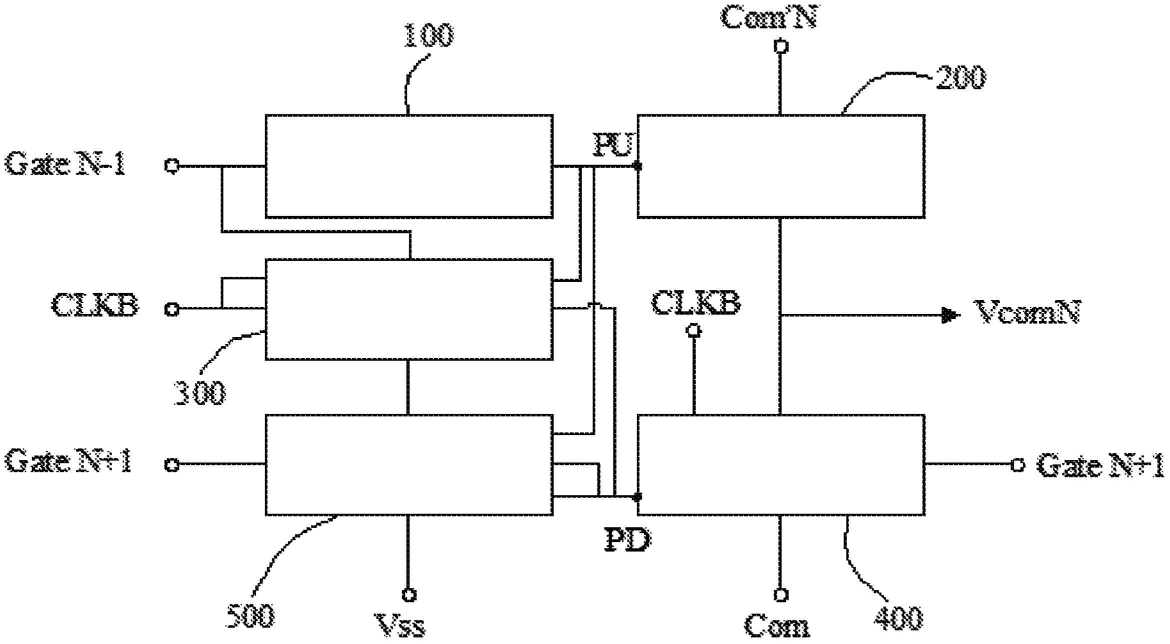
FIG. 1 is a schematic structural diagram of a common voltage compensation circuit unit provided by an embodiment of the present disclosure.

As an exemplary embodiment of the present disclosure, there is provided a common voltage compensation circuit unit, as shown in FIG. 1, that includes a trigger signal terminal Gate N−1, a common voltage output terminal Vcom N, a design common voltage signal terminal Com, a power signal terminal Vss, a compensation common voltage signal terminal Com'N, a reset signal terminal Gate N+1, a clock signal terminal CLKB, a trigger signal input sub-circuit 100, a first output sub-circuit 200, a control sub-circuit 300, a second output sub-circuit 400, and a reset sub-circuit 500.

An input terminal of the trigger signal input sub-circuit 100 is electrically connected to the trigger signal terminal Gate N−1, and an output terminal of the trigger signal input sub-circuit 100 is electrically connected to a first node PU. The trigger signal input sub-circuit 100 is configured to, in response to receiving a first level signal at the input terminal of the trigger signal input sub-circuit 100, bring the input terminal of the trigger signal input sub-circuit 100 into conduction with the output terminal of the trigger signal input sub-circuit 100.

An input terminal of the first output sub-circuit 200 is electrically connected to the compensation common voltage signal terminal Com'N, a control terminal of the first output sub-circuit 200 is electrically connected to the first node PU, and an output terminal of the first output sub-circuit 200 is electrically connected to the common voltage output terminal Vcom N. The first output sub-circuit 200 is configured to, in response to receiving a third level signal at the control terminal of the first output sub-circuit 200, bring the input terminal of the first output sub-circuit 200 into conduction with the output terminal of the first output sub-circuit 200, wherein the absolute value of the third level signal is greater than or equal to that of the first level signal, and the third level signal and the first level signal have the same polarity. A first control terminal of the control sub-circuit 300 is electrically connected to the clock signal terminal CLKB, a second control terminal of the control sub-circuit 300 is electrically connected to a second output terminal of the reset sub-circuit 500, a first input terminal of the control sub-circuit 300 is electrically connected to the clock signal terminal CLKB, a second input terminal of the control sub-circuit 300 is electrically connected to the trigger signal terminal Gate N−1, a first output terminal of the control sub-circuit 300 is electrically connected to the first node PU, and a second output terminal of the control sub-circuit 300 is electrically connected to a second node PD. The control sub-circuit 300 is configured to, in response to receiving the first level signal at the first control terminal of the control sub-circuit 300, bring the second input terminal of the control sub-circuit 300 into conduction with the first output terminal of the control sub-circuit 300 and bring the first input terminal of the control sub-circuit 300 into conduction with the second output terminal of the control sub-circuit 300, and in response to receiving a second level signal at the second control terminal of the control sub-circuit 300, disconnect the first input terminal of the control sub-circuit 300 from the second output terminal of the control sub-circuit 300.

A first control terminal of the second output sub-circuit 400 is electrically connected to the second node PD, a second control terminal of the second output sub-circuit 400 is electrically connected to the reset signal terminal Gate N+1, a third output terminal of the second output sub-circuit 400 is electrically connected to the clock signal terminal CLKB, an input terminal of the second output sub-circuit 400 is electrically connected to the design common voltage signal terminal Com, and an output terminal of the second output sub-circuit 400 is electrically connected to the common voltage output terminal Vcom N. The second output sub-circuit 400 is configured to, in response to receiving the first level signal at at least one of the first control terminal, the second control terminal, or the third control terminal of the second output sub-circuit 400, bring the input terminal of the second output sub-circuit 400 into conduction with the output terminal of the second output sub-circuit 400.

A first control terminal of the reset sub-circuit 500 is electrically connected to the reset signal terminal Gate N+1, a second control terminal of the reset sub-circuit 500 is electrically connected to the second node PD, an input terminal of the reset sub-circuit 500 is electrically connected to the power signal terminal Vss, a first output terminal the reset sub-circuit 500 is electrically connected to the first node PU, a third control terminal of the reset sub-circuit 500 is electrically connected to the first node PU, and a third output terminal of the reset sub-circuit 500 is electrically connected to the second node PD. The reset sub-circuit 500 is configured to, in response to receiving the first level signal at at least one of the first control terminal or the second control terminal of the reset sub-circuit 500, bring the input terminal of the reset sub-circuit 500 into conduction with the first output terminal of the reset sub-circuit 500, and in response to receiving the first level signal at the third control terminal of the reset sub-circuit 500, bring the input terminal of the reset sub-circuit 500 into conduction with the second output terminal and the third output terminal of the reset sub-circuit 500.

As known to those skilled in the art, a display panel includes a plurality of gate lines Gate n−2, Gate n, Gate n−1 . . . and a plurality of data lines which intersect horizontally and vertically, and each of the intersections of the gate lines and the data lines corresponds to one pixel unit. The gate lines are used to provide a driving signal to each row of pixel units, and the data lines are used to provide a data signal to each column of pixel units. The display panel further includes a control terminal driving circuit, and the control terminal driving circuit includes shift register units in one-to-one correspondence with the gate lines, wherein the shift register units are configured to provide driving signals to respective gate lines stage by stage. Specifically, an output terminal of the N-th stage shift register unit is electrically connected to the N-th gate line.

When used in a display panel, the above common voltage compensation circuit unit corresponds to an N-th row of pixel units in the display panel, and the common voltage output terminal Vcom N of the common voltage compensation circuit unit is electrically connected to the common electrodes of the N-th row of pixel units through the N-th common electrode line so as to provide a common voltage signal to the common electrodes of the N-th row of pixel units. The trigger signal terminal Gate N−1 of the common voltage compensation circuit unit is electrically connected to the (N−1)-th gate line Gate n−1, and the reset signal terminal Gate N+1 of the common voltage compensation circuit unit is electrically connected to the (N+1) gate line Gate n+1.

As used herein, one of the terms "first level signal" and "second level signal" indicates a high level signal and the other indicates a low level signal. For example, when the transistor used in the common voltage compensation circuit unit is an N-type transistor, the first level signal indicates a high level signal, and the second level signal indicates a low level signal. In contrast, when the transistor used in the common voltage compensation circuit unit is a P-type transistor, the first level signal indicates a low level signal, and the second level signal indicates a high level signal.

Figure 2:
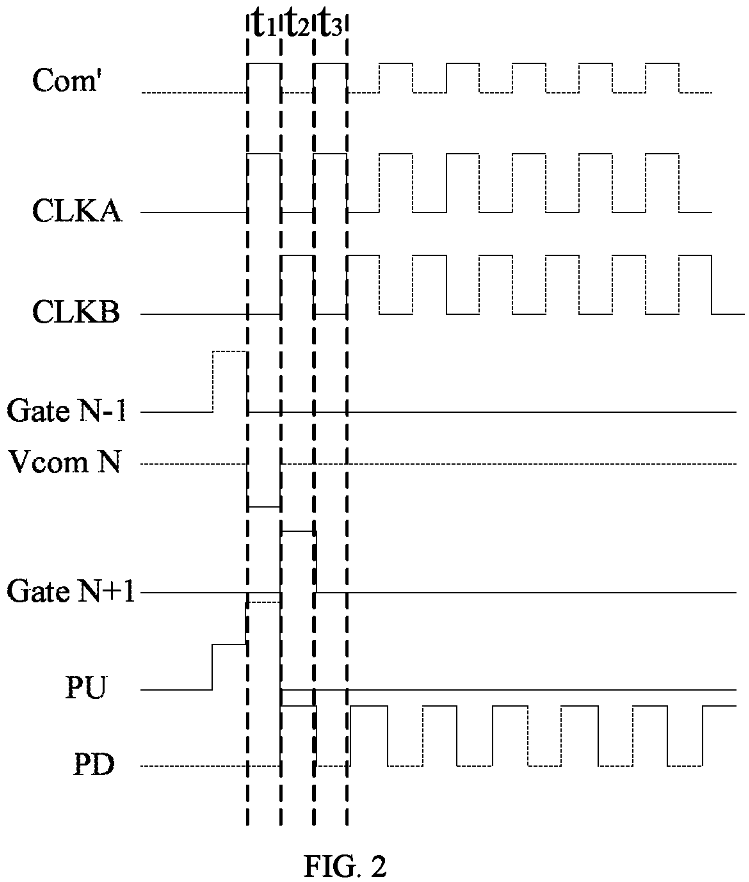
FIG. 2 is a timing diagram of operation signals of a common voltage compensation circuit unit provided by an embodiment of the present disclosure.

The operation of the common voltage compensation circuit unit shown in FIG. 2 will be described below with reference to FIG. 2. As shown in FIG. 2, each operating period of the common voltage compensation circuit unit includes three phases: an input phase t1, a display output phase t2, and a reset phase t3. It is to be noted that in FIG. 2, the operation of the common voltage compensation circuit unit is illustrated based on an example in which the transistors used in the common voltage compensation circuit unit are N-type transistors. However, the present disclosure is not so limited. It is assumed that the signal provided by the compensation common voltage signal terminal Com'N is a square wave, and the design common voltage signal or the compensation common voltage signal is provided in different phases.

In the input phase t1, the first level signal is input from the trigger signal terminal Gate N−1, the second level signal is input from the clock signal terminal CLKB, the second level signal is input from the reset signal terminal Gate N+1, and a design common voltage signal is input from the compensation common voltage signal terminal ComN. At that time, the trigger signal input sub-circuit 100 brings its input terminal into conduction with its output terminal in response to receiving the first level signal at its input terminal, and thus stores at the first node PU the first level signal provided via the trigger signal terminal Gate N−1. Since the control terminal of the first output sub-circuit 200 is electrically connected to the first node PU, the control terminal of the first output sub-circuit 200 receives the first level signal. At the same time, the third control terminal of the reset sub-circuit 500 receives the first level signal so that the input terminal of the reset sub-circuit 500 is brought into conduction with the second output terminal of the reset sub-circuit 500, thus the second control terminal of the control sub-circuit 300 receives the second level signal. Moreover, the third control terminal of the reset sub-circuit 500 receives the first level signal so that the input terminal of the reset sub-circuit 500 is brought into conduction with the third output terminal of the reset sub-circuit 500. Therefore, the first control terminal of the second output sub-circuit 400 receives the second level signal. Since the control terminal of the first output sub-circuit 200 receives the first level signal, the input terminal of the first output sub-circuit 200 is brought into conduction with the output terminal of the first output sub-circuit 200. Since the signal input from the compensation common voltage signal terminal Com'N at that time is the design common voltage signal, the signal output from the common voltage output terminal Vcom N is the design common voltage signal.

In the display output phase t2, the second level signal is input from the trigger signal terminal Gate N−1, the second level signal is input from the clock signal terminal CLKB, and a compensation common voltage signal is input from the compensation common voltage signal terminal Com'N. Since the input terminal of the trigger signal input sub-circuit 100 receives the second level signal, the input terminal of the trigger signal input sub-circuit 100 is disconnected from the output terminal of the trigger signal input sub-circuit 100. In the case where the input terminal of the trigger signal input sub-circuit 100 is disconnected from the output terminal of the trigger signal input sub-circuit 100, the signal at the control terminal of the first output sub-circuit 200 will transition to the third level signal so that the input terminal of the first output sub-circuit 200 is brought into conduction with the output terminal of the first output sub-circuit 200, enabling the common voltage output terminal Vcom N to output the compensation common voltage signal. At the same time, since the control terminal of the first output sub-circuit 200 is electrically connected to the third control terminal of the reset sub-circuit 500, the input terminal of the reset sub-circuit 500 is brought into conduction with the third output terminal of the reset sub-circuit 500, so that the second node PD receives the second level signal. Since the first control terminal of the second output sub-circuit 400 is electrically connected to the second node PD, and the second control terminal of the second output sub-circuit 400 is electrically connected to the reset signal terminal Gate N+1, the input terminal of the second output sub-circuit 400 is disconnected from the output terminal of the second output sub-circuit 400, ensuring that the signal output by the common voltage output terminal at that time is the compensation common voltage signal.

In the reset phase t3, the first level signal is input from the clock signal terminal CLKB, the second level signal is input from the trigger signal terminal Gate N−1, and the first level signal is input from the reset signal terminal Gate N+1. Therefore, the input terminal of the trigger signal input sub-circuit 100 is disconnected from the output terminal of the trigger signal input sub-circuit 100, and the input terminal of the reset sub-circuit 500 is brought into conduction with the first output terminal of the reset sub-circuit 500, so that the first node PU receives the second level signal, thereby resetting the control terminal of the first output sub-circuit 200. At the same time, since the third control terminal of the second output sub-circuit 400 receives the first level signal input from the clock signal terminal CLKB, the input terminal of the second output sub-circuit 400 is brought into conduction with the output terminal of the second output sub-circuit 400, so that the signal output by the common voltage signal output terminal is the design common voltage signal input from the design common voltage signal terminal Com.

As can be seen from the above description, during operation, the common voltage compensation circuit unit provides the design common voltage signal to a corresponding common electrode line in the input phase t1 and the reset phase t3, and provides the compensation common voltage signal to the corresponding common electrode line in the display output phase t2.

It is to be noted that the value of the compensation common voltage input from the compensation common voltage signal terminal Com'N is obtained by compensation calculation. In such calculation, the influence of the parasitic capacitance on the deflection of liquid crystal molecules in the display phase needs to be taken into account. For example, the compensation common voltage can be calculated according to Formula (1) and Formula (2) as follows:

$$ComN - Com'N = \Delta Vp \tag{1}$$

$$\Delta Vp = \frac{(Vgh - Vg1) * Cgd}{Cgd + Cs + C1c} \tag{2}$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the N-th row of pixel units;

Cs is a storage capacitance of the pixel unit; and

Clc is a liquid crystal capacitance of the pixel unit.

By virtue of the compensation common voltage, the influence of the parasitic capacitance on the common voltage input to the common electrode line can be eliminated in the display output phase, thereby precisely controlling the deflection of liquid crystal molecules in the pixel units, eliminating the artifacts, and improving the display effect of the display panel.

In addition, in other phases than the display output phase, the common voltage compensation circuit unit still outputs the design common voltage to the corresponding common electrode line, and thus the deflection state of liquid crystal molecules in other pixel units that do not take part in the display output will not be affected.

Further, since the common voltage compensation circuit unit employs the output signals of the shift register units of a previous stage and a subsequent stage as a trigger signal and a reset signal respectively, it can be synchronized with a corresponding shift register unit, so as to be able to control the voltage on the corresponding common electrodes of the display panel at precise moments via the corresponding common electrode line, thereby realizing better driving and display effects.

The specific structure of each sub-circuit is not particularly limited in the present disclosure as long as the functions described above can be realized in various phases of the display period.

Figure 3:
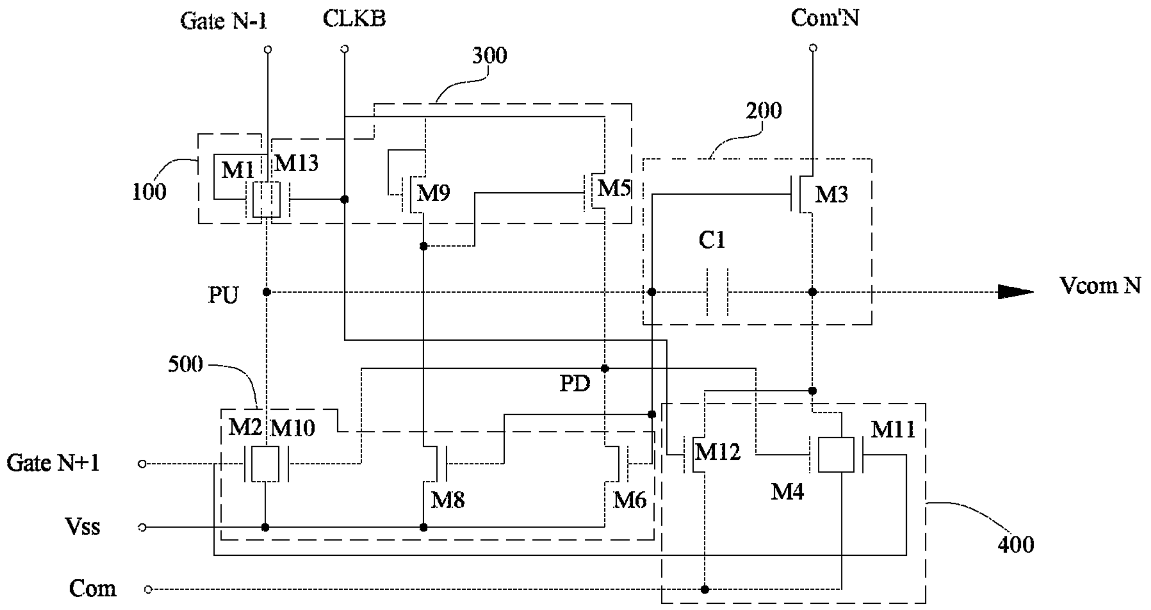
FIG. 3 is a schematic diagram showing a specific structure of a common voltage compensation circuit unit provided by an embodiment of the present disclosure.

FIG. 3 illustrates a circuit diagram of a common voltage compensation circuit unit according to an embodiment of the present disclosure.

Specifically, the trigger signal input sub-circuit 100 includes a trigger input transistor M1. A first terminal and a control terminal of the trigger input transistor M1 are electrically connected to the input terminal of the trigger signal input sub-circuit 100 (i.e., the control terminal and the first terminal of the trigger input transistor M1 are electrically connected to the trigger signal terminal Gate N−1), and a second terminal of the trigger input transistor M1 is electrically connected to the output terminal of the trigger signal input sub-circuit 100.

When the first level signal is input from the trigger signal terminal Gate N−1, the trigger input transistor M1 is turned on to transfer the first level signal input from the trigger signal terminal Gate N−1 to the control terminal of the first output sub-circuit 200. When the second level signal is input from the trigger signal terminal Gate N−1, the trigger input transistor M1 is turned off.

According to an exemplary embodiment, the first output sub-circuit 200 includes a display output transistor M3 and a storage capacitor C1. As shown in FIG. 3, a control terminal of the display output transistor M3 is electrically connected to the control terminal of the first output sub-circuit 200, a first terminal of the display output transistor M3 is electrically connected to the compensation common voltage signal terminal Com'N, and a second terminal of the display output transistor M3 is electrically connected to the common voltage output terminal Vcom N. A first terminal of the storage capacitor C1 is electrically connected to the first node PU, and a second terminal of the storage capacitor C1 is electrically connected to the output terminal of the first output sub-circuit 200.

When the control terminal of the display output transistor M3 receives the first level signal, the display output transistor M3 is turned on, thereby bringing the compensation common voltage signal terminal Com'N into conduction with the common voltage output terminal Vcom N.

According to an exemplary embodiment, the control sub-circuit 300 includes a first control transistor M13, a second control transistor M9, and a third control transistor M5.

As shown in FIG. 3, a control terminal of the first control transistor M13 is electrically connected to the first control terminal of the control sub-circuit 300 (i.e., electrically connected to the clock signal terminal CLKB), a first terminal of the first control transistor M13 is electrically connected to the second input terminal of the control sub-circuit 300 (i.e., electrically connected to the trigger signal terminal Gate N−1), and a second terminal of the first control transistor M13 is electrically connected to the first output terminal of the control sub-circuit 300 (i.e., electrically connected to the first node PU).

A control terminal and a first terminal of the second control transistor M9 are electrically connected to the first input terminal of the control sub-circuit 300 (i.e., electrically connected to the clock signal terminal CLKB), and a second terminal of the second control transistor M9 is electrically connected to the second control terminal of the control sub-circuit 300.

A control terminal of the third control transistor M5 is electrically connected to the second control terminal of the control sub-circuit 300 (i.e., electrically connected to the second terminal of the second control transistor M9), a first terminal of the third control transistor M5 is electrically connected to the first input terminal of the control sub-circuit 300 (i.e., electrically connected to the clock signal terminal CLKB), and a second terminal of the third control transistor M5 is electrically connected to the second output terminal of the control sub-circuit (i.e., electrically connected to the second node PD).

When the first level signal is input from the clock signal terminal CLKB, the first control terminal of the control sub-circuit 300 receives the first level signal such that both the first control transistor M13 and the second control transistor M9 are turned on. As shown in FIG. 2, when the first level signal is input from the clock signal terminal CLKB, the second level signal is input from the trigger signal terminal Gate N−1. Thus, the control sub-circuit 300 outputs the second level signal to the control terminal of the first output sub-circuit 200, ensuring that the input terminal of the first output sub-circuit 200 is disconnected from the output terminal of the first output sub-circuit 200. At the same time, the turned-on second control transistor M9 can transfer the first level signal input via the clock signal terminal CLKB to the control terminal of the third control transistor M5 to bring the third control transistor M5 into conduction, and then the first level signal input via the clock signal terminal CLKB is eventually transferred to the second node PD.

When the second level signal is input from the first clock signal terminal CLKB, both the first control transistor M13 and the second control transistor M9 are turned off.

The main purpose of providing the reset sub-circuit 500 is to reset the control terminal of the first output sub-circuit 200 after the end of the display output phase, ensuring that the common voltage compensation circuit unit outputs the design common voltage provided by the design common voltage signal terminal Com in other phases than the display output phase.

The specific structure of the reset sub-circuit 500 is not particularly limited in the present disclosure. For example, in the example shown in FIG. 3, the reset sub-circuit 500 may include a first reset transistor M10, a second reset transistor M2, a third reset transistor M8, and a fourth reset transistor M6.

As shown in FIG. 3, a control terminal of the first reset transistor M10 is electrically connected to the second control terminal of the reset sub-circuit 500 (i.e., electrically connected to the second node PD), a first terminal of the first reset transistor M10 is electrically connected to the input terminal of the reset sub-circuit 500 (i.e., electrically connected to the power signal terminal Vss), and a second terminal of the first reset transistor M10 is electrically connected to the first output terminal of the reset sub-circuit 500 (i.e., electrically connected to the first node PU).

A control terminal of the second reset transistor M2 is electrically connected to the first control terminal of the reset sub-circuit 500, a first terminal of the second reset transistor M2 is electrically connected to the input terminal of the reset sub-circuit 500 (i.e., electrically connected to the power signal terminal Vss), and a second terminal of the second reset transistor M2 is electrically connected to the first output terminal of the reset sub-circuit 500 (i.e., electrically connected to the first node PU).

A control terminal of the third reset transistor M8 is electrically connected to the third control terminal of the reset sub-circuit 500 (i.e., electrically connected to the first node PU), a first terminal of the third reset transistor M8 is electrically connected to the input terminal of the reset sub-circuit 500 (i.e., electrically connected to the power signal terminal Vss), and a second terminal of the third reset transistor M8 is electrically connected to the second output terminal of the reset sub-circuit 500 (i.e., electrically connected to the second node PD).

A control terminal of the fourth reset transistor M6 is electrically connected to the third control terminal of the reset sub-circuit 500 (i.e., electrically connected to the first node PU), a first terminal of the fourth reset transistor M6 is electrically connected to the input terminal of the reset sub-circuit 500 (i.e., electrically connected to the power signal terminal Vss), and a second terminal of the fourth reset transistor M6 is electrically connected to the third output terminal of the reset sub-circuit 500 (i.e., electrically connected to the second node PD).

Since the reset sub-circuit 500 includes three control terminals, the output signals of the respective output terminals (including the first output terminal, the second output terminal, and the third output terminal) of the reset sub-circuit 500 are controlled by three kinds of control signals. The output of the reset sub-circuit 500 will be described in detail below with reference to FIG. 2, which will not be described here.

In the present disclosure, the primary role of the second output sub-circuit 400 is to ensure that the common voltage compensation circuit unit is able to output a design common voltage signal in the reset phase t3. The specific structure of the second output sub-circuit 400 is not particularly limited, either. For example, as shown in FIG. 3, the second output sub-circuit 400 may include a first reset output transistor M11, a second reset output transistor M12, and a third reset output transistor M4.

A control terminal of the first reset output transistor M11 is electrically connected to the second control terminal of the second output sub-circuit 400 (i.e., electrically connected to the reset signal terminal Gate N+1), a first terminal of the first reset output transistor M11 is electrically connected to the input terminal of the second output sub-circuit 400 (i.e., electrically connected to the design common voltage signal terminal Com), and a second terminal of the first reset output transistor M11 is electrically connected to the output terminal of the second output sub-circuit 400 (i.e., electrically connected to the common voltage output terminal Vcom N).

A control terminal of the second reset output transistor M12 is electrically connected to the third control terminal of the second output sub-circuit 400, a first terminal of the second reset output transistor M12 is electrically connected to the input terminal of the second output sub-circuit 400 (i.e., electrically connected to the design common voltage signal terminal Com), and a second terminal of the second reset output transistor M12 is electrically connected to the output terminal of the second output sub-circuit 400 (i.e., electrically connected to the common voltage output terminal Vcom N).

A control terminal of the third reset output transistor M4 is electrically connected to the first control terminal of the second output sub-circuit 400 (i.e., electrically connected to the second node PD), a first terminal of the third reset output transistor M4 is electrically connected to the input terminal of the second output sub-circuit 400 (i.e., electrically connected to the design common voltage signal terminal Com), and a second terminal of the third reset output transistor M4 is electrically connected to the output terminal of second output sub-circuit 400 (i.e., electrically connected to the common voltage output terminal Vcom N).

When the first level signal is received at the control terminal of any one of the first reset output transistor M11, the second reset output transistor M12, or the third reset output transistor M4, the input terminal of the second output sub-circuit 400 is brought into conduction with the output terminal of the second output sub-circuit 400, so that the common voltage output terminal Vcom N outputs a design common voltage signal.

As known to those skilled in the art, a transistor is typically a three-terminal element. Herein, the terminal that controls the transistor to be turned on and off is referred to as its "control terminal", and the other two terminals are referred to as "first terminal" and "second terminal", respectively. For example, in the case of a field effect transistor, its control terminal is the gate, its first terminal may be the drain, and its second terminal may be the source.

The specific operation of the common voltage compensation circuit unit provided by an embodiment of the present disclosure will be described in detail below with reference to FIGS. 2 and 3.

In the common voltage compensation circuit unit shown in FIG. 3, it is assumed that all the transistors are N-type transistors and accordingly, the first level signal is a high level signal and the second level signal is a low level signal. The signal provided by the compensation common voltage signal terminal Com'N is a square wave, and the design common voltage signal or the compensation common voltage signal is provided in different phases.

As shown in FIG. 2, one operating period of the common voltage compensation circuit unit shown in FIG. 3 includes an input phase t1, a display output phase t2, and a reset phase t3.

In the input phase t1, a first level signal is received from the trigger signal terminal Gate N−1, a second level signal is received from the clock signal terminal CLKB, and a second level signal is received from the reset signal terminal Gate N+1. Therefore, the first terminal and the second terminal of the trigger input transistor M1 are brought into conduction, so that the first level signal input from the trigger signal terminal Gate N−1 is transferred to the control terminal of the first output sub-circuit 200 and charges the storage capacitor C1. In the input phase t1, the first level signal input via the trigger signal terminal Gate N−1 is stored in the storage capacitor C1, and the control terminal of the display output transistor M3 receives the first level signal. Thus, the display output transistor M3 is turned on. At that time, the signal provided by the compensation common voltage signal terminal Com'N is a design common voltage signal, and therefore, the design common voltage signal is output from the common voltage output terminal Vcom. Meanwhile, since the signal input from the clock signal terminal CLKB is the second level signal, the first control transistor M13, the second control transistor M9 and the second reset output transistor M12 are all turned off, and the fourth reset transistor M6 and the third reset transistor M8 are turned on. Thus, the second level signal input from the power signal terminal Vss is transferred to the control terminal of the third control transistor M5, so that the third control transistor M5 is also turned off.

In the display output phase t2, the second level signal is input from the trigger signal terminal Gate N−1, the second level signal is input from the reset signal terminal Gate N+1, and the second level signal is input from the clock signal terminal CLKB. Therefore, the trigger input transistor M1 is turned off, and the first control transistor M13 is turned off. At that time, the first node PU is in a floating state. Since the display output transistor M3 is turned on in the previous phase t1, the display output transistor M3 is still turned on in the display output phase t2, thereby transferring the compensation common voltage signal input from the compensation common voltage signal terminal ComN to the second terminal of the storage capacitor C1. At that time, due to the self-boosting effect of the storage capacitor C1, the potential of the first node PU electrically connected to the first terminal of the storage capacitor C1 will be pulled up to the third level signal, so that the display output transistor M3 remains turned on. At that time, the signal output from the common voltage output terminal Vcom N is the compensation common voltage signal provided by the compensation common voltage signal terminal Com'N. In this phase, the input terminals of the reset sub-circuit 500 and the second output sub-circuit 400 are all disconnected from their output terminals, so that the output of the common voltage compensation circuit unit will not be affected.

In the reset phase t3, the first level signal is input from the clock signal terminal CLKB, so the first control transistor M13 and the second control transistor M9 are turned on, thereby transferring the second level signal input from the trigger signal terminal Gate N−1 to the first node PU. Since the second control transistor M9 is turned on, the third control transistor M5 is also turned on to transfer the first level signal input from the clock signal terminal CLKB to the second node PD. Thus, the third reset output transistor M4 is turned on to transfer the design common voltage input from the design common voltage signal terminal Com to the common voltage output terminal Vcom N.

As can be seen from the above description, during operation, the common voltage compensation circuit unit shown in FIG. 3 outputs a compensation common voltage signal in the display output phase and outputs a design common voltage signal in the remaining phases.

The compensation common voltage can be calculated according to the following formulas:

$$ComN - Com'N = \Delta Vp$$

$$\Delta Vp = \frac{(Vgh - Vg1) * Cgd}{Cgd + Cs + C1c}$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a parasitic capacitance between a gate and a drain of a thin film transistor in one pixel unit among the N-th row of pixel units;

Cs is a storage capacitance of the pixel unit; and

Clc is a liquid crystal capacitance of the pixel unit.

For a specific pixel unit, the size of the thin film transistor, the size of the pixel electrode, and the size of the common electrode are all known, and the magnitude of the design common voltage, the voltage value of the first level signal, and the voltage value of the second level signal are all known. Thus, the parasitic capacitance between the gate and the drain can be easily obtained by calculation. Therefore, the voltage value of the compensation common voltage signal can be obtained by calculation with the above formulas.

Figure 4:
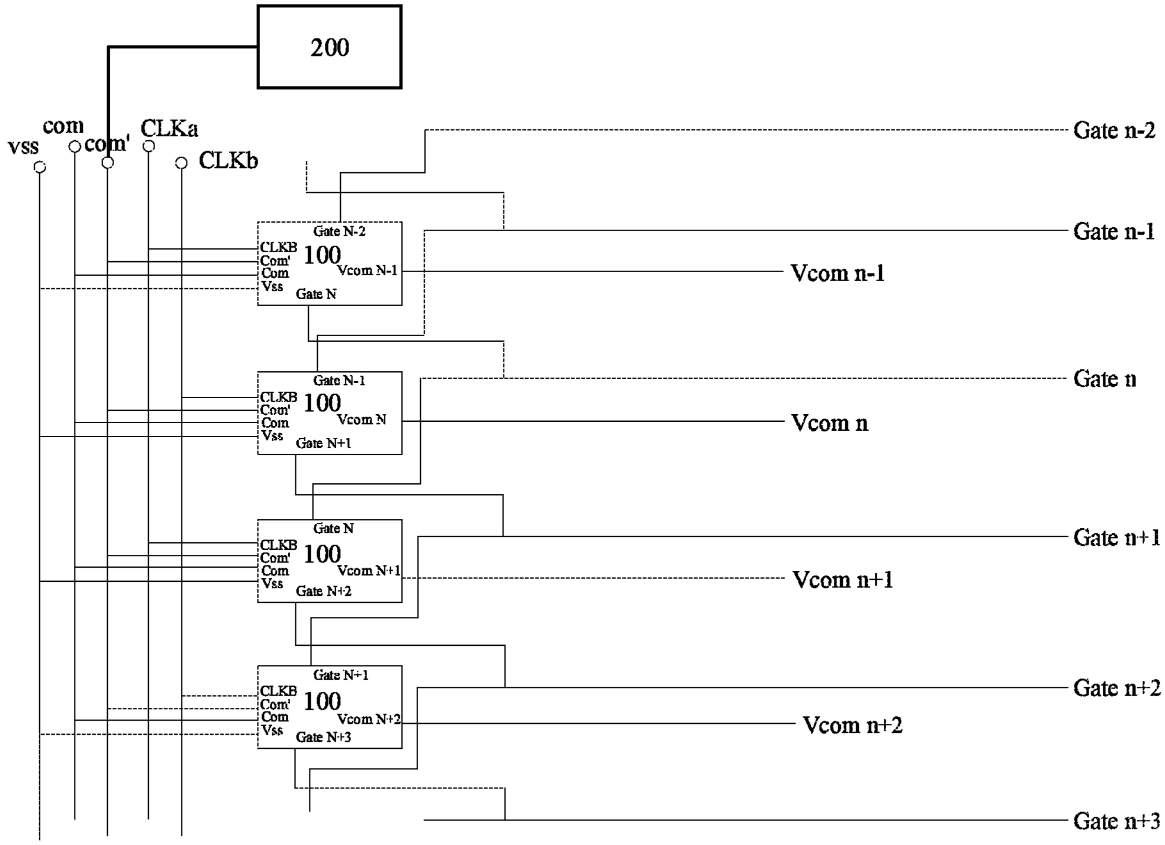
FIG. 4 is a schematic diagram showing a portion of a display panel provided by an embodiment of the present disclosure.

As another exemplary embodiment of the present disclosure, there is provided a display panel that includes a plurality of cascaded common voltage compensation circuit units described above. As shown in FIG. 4, the display panel includes a plurality of cascaded common voltage compensation circuit units 100, a plurality of gate lines Gate n−2, Gate n−1, Gate n, . . . , a plurality of common electrode lines Vcom n−1, Vcom n, Vcom n+1, . . . , a first clock signal line CLKa, a second clock signal line CLKb, a power signal line vss, a design common voltage signal line com, and a compensation common voltage signal line com'.

The common voltage output terminal Vcom N of each of the common voltage compensation circuit units 100 is electrically connected to a corresponding common electrode line Vcom n, the trigger signal terminal Gate N−1 of each of the common voltage compensation circuit units 100 is electrically connected to a corresponding gate line Gate n−1, the reset signal terminal Gate N+1 of each of the common voltage compensation circuit units 100 is electrically connected to another corresponding gate line Gate n+1, the power signal terminal Vss of each of the common voltage compensation circuit units 100 is electrically connected to the power signal line vss, the design common voltage signal terminal Com of each of the common voltage compensation circuit units 100 is electrically connected to the design common voltage signal line com, and the compensation common voltage signal terminal Com'N of each of the common voltage compensation circuit units 100 is electrically connected to the compensation common voltage signal line com'.

When the common voltage compensation circuit unit 100 corresponds to an odd-row common electrode line, the clock signal terminal CLKB of this common voltage compensation circuit unit 100 is electrically connected to the first clock signal line CLKa. When the common voltage compensation circuit unit 100 corresponds to an even-row common electrode line, the clock signal terminal CLKB of this common voltage compensation circuit unit 100 is electrically connected to the second clock signal line CLKb.

The compensation common voltage signal line com' is electrically connected to a common voltage generating chip 200. When the first clock signal line CLKa or the second clock signal line CLKb connected to the clock signal terminal CLKB of the common voltage compensation circuit unit 100 provides the first level signal, the common voltage generating chip 200 provides a design common voltage signal to the compensation common voltage signal line com'. When the first clock signal line CLKa or the second clock signal line CLKb connected to the clock signal terminal CLKB of the common voltage compensation circuit unit 100 provides the second level signal, the common voltage generating chip 200 provides a compensation common voltage signal to the compensation common voltage signal line com'. It will be understood that only a portion of the display panel is illustrated in FIG. 4, while other components indispensable to the display panel are omitted so as not to obscure the understanding of the present disclosure. It is to be noted that in FIG. 4, N and n have the same value, both of which are only used to distinguish the terminals in the common voltage compensation circuit units from the gate lines and the common electrode lines. For the convenience of description, N and n are assumed to be even numbers.

As shown in FIG. 4, an (n−1)-th row common electrode line Vcom n−1 is electrically connected to the common voltage output terminal Vcom N−1 of a corresponding (N−1)-th stage common voltage compensation circuit unit 100. The trigger signal terminal Gate N−2 of the (N−1)-th stage common voltage compensation circuit unit 100 is electrically connected to an (n−2)-th row gate line Gate n−2. The clock signal terminal CLKB of the (N−1)-th stage common voltage compensation circuit unit 100 is electrically connected to the first clock signal line CLKa. The compensation common voltage signal terminal Com'N−1 of the (N−1)-th stage common voltage compensation circuit unit 100 is electrically connected to the compensation common voltage signal line com'. The design common voltage terminal Com of the (N−1)-th stage common voltage compensation circuit unit 100 is electrically connected to the design common voltage signal line com. The power signal terminal Vss of the (N−1)-th stage common voltage compensation circuit unit 100 is electrically connected to the power signal line vss.

An n-th row common electrode line Vcom n is electrically connected to the common voltage output terminal Vcom N of a corresponding N-th stage common voltage compensation circuit unit 100. The trigger signal terminal Gate N−1 of the N-th stage common voltage compensation circuit unit 100 is electrically connected to an (n−1)-th row gate line Gate n−1. The clock signal terminal CLKB of the N-th stage common voltage compensation circuit unit 100 is electrically connected to the second clock signal line CLKb. The compensation common voltage signal terminal Com'N of the N-th stage common voltage compensation circuit unit 100 is electrically connected to the compensation common voltage signal line com'. The design common voltage terminal Com of the N-th stage common voltage compensation circuit unit 100 is electrically connected to the design common voltage signal line com. The power signal terminal Vss of the N-th stage common voltage compensation circuit unit 100 is electrically connected to the power signal line vss.

An (n+1)-th row common electrode line Vcom n+1 is electrically connected to the common voltage output terminal Vcom N+1 of a corresponding (N+1)-th stage common voltage compensation circuit unit 100. The trigger signal terminal Gate N of the (N+1)-th stage common voltage compensation circuit unit 100 is electrically connected to an n-th row gate line Gate n. The clock signal terminal CLKB of the (N+1)-th stage common voltage compensation circuit unit 100 is electrically connected to the first clock signal line CLKa. The compensation common voltage signal terminal Com'N+1 of the (N+1)-th stage common voltage compensation circuit unit 100 is electrically connected to the compensation common voltage signal line com'. The design common voltage terminal Com of the (N+1)-th stage common voltage compensation circuit unit 100 is electrically connected to the design common voltage signal line com. The power signal terminal Vss of the (N+1)-th stage common voltage compensation circuit unit 100 is electrically connected to the power signal line vss.

An (n+2)-th row common electrode line Vcom n+2 is electrically connected to the common voltage output terminal Vcom N+2 of a corresponding (N+2)-th stage common voltage compensation circuit unit 100. The trigger signal terminal Gate N+1 of the (N+2)-th stage common voltage compensation circuit unit 100 is electrically connected to an (n+1)-th row gate line Gate n+1. The clock signal terminal CLKB of the (N+2)-th stage common voltage compensation circuit unit 100 is electrically connected to the second clock signal line CLKb. The compensation common voltage signal terminal Com'N+2 of the (N+2)-th stage common voltage compensation circuit unit 100 is electrically connected to the compensation common voltage signal line com'. The design common voltage terminal Com of the (N+2)-th stage common voltage compensation circuit unit 100 is electrically connected to the design common voltage signal line com. The power signal terminal Vss of the (N+2)-th stage common voltage compensation circuit unit 100 is electrically connected to the power signal line vss.

The connections described above can ensure that the common voltage compensation circuit units operate synchronously with corresponding gate lines, thereby performing precise common voltage compensation for each row of pixel units.

As described above, the display panel includes multiple rows of pixel units, each row of pixel units includes a plurality of pixel units, and the multiple rows of pixel units are in one-to-one correspondence with multiple rows of common electrodes.

The common voltage generating chip can calculate the compensation common voltage signal according to Formula (1) and Formula (2) as follows:

$$ComN - Com'N = \Delta Vp \tag{1}$$

$$\Delta Vp = \frac{(Vgh - Vgl) * Cgd}{Cgd + Cs + Clc} \tag{2}$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a capacitance between a gate and a drain of a thin film transistor in one pixel unit among the N-th row of pixel units;

Cs is a storage capacitance of the pixel unit; and

Clc is a liquid crystal capacitance of the pixel unit.

In an exemplary embodiment, in order to enable the pixel units to display an image accurately, each common electrode line corresponds to a common voltage compensation circuit unit.

As a further exemplary embodiment of the present disclosure, there is provided a display device including the display panel described above.

Figure 5:
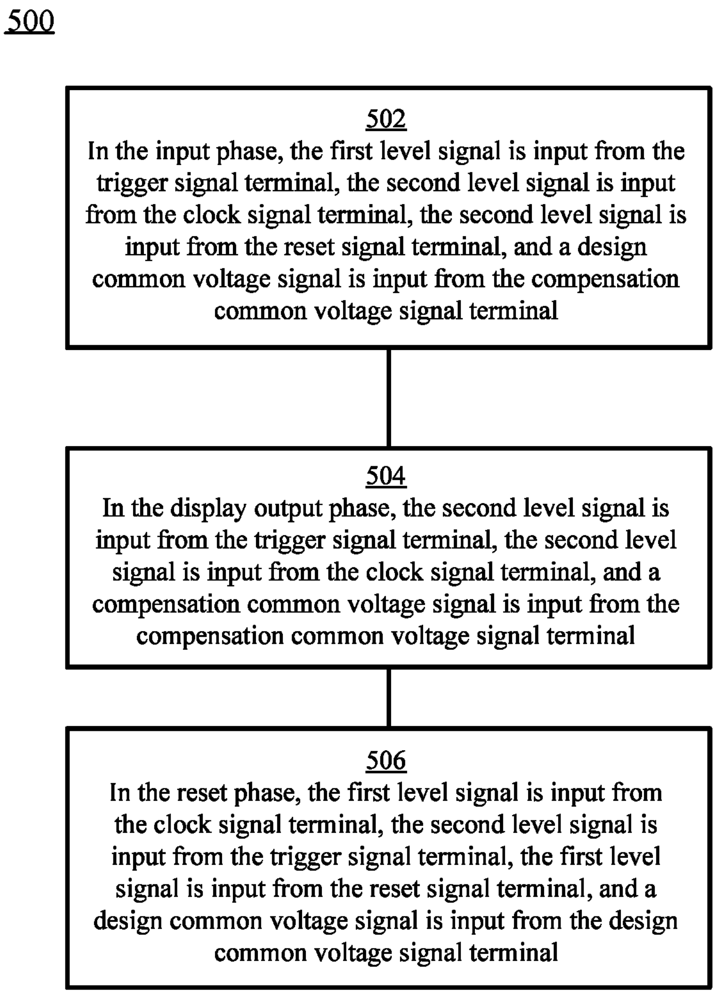
FIG. 5 is a flowchart of a common voltage compensation method provided by an embodiment of the present disclosure.

As yet another exemplary embodiment of the present disclosure, there is provided a common voltage compensation method which employs any of the common voltage compensation circuit units described above. As shown in FIG. 5, the common voltage compensation method 500 includes an input phase 502, a display output phase 504, and a reset phase 506.

In the input phase 502, the first level signal is input from the trigger signal terminal, the second level signal is input from the clock signal terminal, the second level signal is input from the reset signal terminal, and a design common voltage signal is input from the compensation common voltage signal terminal.

In the display output phase 504, the second level signal is input from the trigger signal terminal, the second level signal is input from the clock signal terminal, and a compensation common voltage signal is input from the compensation common voltage signal terminal.

In the reset phase 506, the first level signal is input from the clock signal terminal, the second level signal is input from the trigger signal terminal, the first level signal is input from the reset signal terminal, and a design common voltage signal is input from the design common voltage signal terminal.

In the common voltage compensation circuit unit, the display panel, the display device, and the common voltage compensation method provided by the present disclosure, the influence of the parasitic capacitance on the common voltage input to the common electrode line may be eliminated in the display output phase by providing a compensation common voltage, thereby precisely controlling the deflection of liquid crystal molecules in pixel units, eliminating the artifacts, and improving the display effect of the display panel.

In addition, in other phases than the display output phase, the common voltage compensation circuit unit still outputs a design common voltage to a corresponding common electrode line, thus the deflection state of the liquid crystal molecules in other pixel units that do not take part in the display output will not be affected.

Further, since the common voltage compensation circuit unit employs the output signals of the shift register units of a previous stage and a subsequent stage as a trigger signal and a reset signal respectively, it can be synchronized with a corresponding shift register unit, so as to be able to control the voltage on corresponding common electrodes of the display panel at precise moments via a corresponding common electrode line, thereby realizing better driving and display effects.

It can be understood that the foregoing are only exemplary embodiments for purposes of illustrating the principle of the present disclosure, and that the present disclosure is not so limited. Various variations and improvements may be made by those ordinarily skilled in the art without departing from the spirit and essence of the present disclosure, which variations and improvements are regarded as falling within the scope of the present disclosure.

What is claimed is:

1. A common voltage compensation circuit unit, comprising a trigger signal terminal, a common voltage output terminal, a design common voltage signal terminal, a power signal terminal, a compensation common voltage signal terminal, a reset signal terminal, a clock signal terminal, a trigger signal input sub-circuit, a first output sub-circuit, a control sub-circuit, a second output sub-circuit, and a reset sub-circuit, wherein:

an input terminal of the trigger signal input sub-circuit is electrically connected to the trigger signal terminal, an output terminal of the trigger signal input sub-circuit is electrically connected to a first node, and the trigger signal input sub-circuit is configured to, in response to receiving a first level signal at the input terminal of the trigger signal input sub-circuit, bring the input terminal of the trigger signal input sub-circuit into conduction with the output terminal of the trigger signal input sub-circuit;

an input terminal of the first output sub-circuit is electrically connected to the compensation common voltage signal terminal, a control terminal of the first output sub-circuit is electrically connected to the first node, an output terminal of the first output sub-circuit is electrically connected to the common voltage output terminal, and the first output sub-circuit is configured to, in response to receiving a third level signal at the control terminal of the first output sub-circuit, bring the input terminal of the first output sub-circuit into conduction with the output terminal of the first output sub-circuit, wherein an absolute value of the third level signal is greater than or equal to an absolute value of the first level signal, and the third level signal and the first level signal have a same polarity;

a first control terminal of the control sub-circuit is electrically connected to the clock signal terminal, a second control terminal of the control sub-circuit is electrically connected to a second output terminal of the reset sub-circuit, a first input terminal of the control sub-circuit is electrically connected to the clock signal terminal, a second input terminal of the control sub-circuit is electrically connected to the trigger signal terminal, a first output terminal of the control sub-circuit is electrically connected to the first node, a second output terminal of the control sub-circuit is electrically connected to a second node, and the control sub-circuit is configured to, in response to receiving the first level signal at the first control terminal of the control sub-circuit, bring the second input terminal of the control sub-circuit into conduction with the first output terminal of the control sub-circuit, and in response to receiving a second level signal at the second control terminal of the control sub-circuit, disconnect the first input terminal of the control sub-circuit from the second output terminal of the control sub-circuit;

a first control terminal of the second output sub-circuit is electrically connected to the second node, a second control terminal of the second output sub-circuit is electrically connected to the reset signal terminal, a third control terminal of the second output sub-circuit is electrically connected to the clock signal terminal, an input terminal of the second output sub-circuit is electrically connected to the design common voltage signal terminal, an output terminal of the second output sub-circuit is electrically connected to the common voltage output terminal, and the second output sub-circuit is configured to, in response to receiving the first level signal at at least one of the first control terminal, the second control terminal, or the third control terminal of the second output sub-circuit, bring the input terminal of the second output sub-circuit into conduction with the output terminal of the second output sub-circuit;

a first control terminal of the reset sub-circuit is electrically connected to the reset signal terminal, a second control terminal of the reset sub-circuit is electrically connected to the second node, a third control terminal of the reset sub-circuit is electrically connected to the first node, an input terminal of the reset sub-circuit is electrically connected to the power signal terminal, a first output terminal of the reset sub-circuit is electrically connected to the first node, a third output terminal of the reset sub-circuit is electrically connected to the second node, and the reset sub-circuit is configured to, in response to receiving the first level signal at at least one of the first control terminal or the second control terminal of the reset sub-circuit, bring the input terminal of the reset sub-circuit into conduction with the first output terminal of the reset sub-circuit, and in response to receiving the first level signal at the third control terminal of the reset sub-circuit, bring the input terminal of the reset sub-circuit into conduction with the second output terminal and the third output terminal of the reset sub-circuit.

2. The common voltage compensation circuit unit according to claim 1, wherein the trigger signal input sub-circuit comprises a trigger input transistor, a first terminal of the trigger input transistor being electrically connected to the input terminal of the trigger signal input sub-circuit, and a second terminal of the trigger input transistor being electrically connected to the output terminal of the trigger signal input sub-circuit.

3. The common voltage compensation circuit unit according to claim 1, wherein the first output sub-circuit comprises a display output transistor and a storage capacitor, a control terminal of the display output transistor being electrically connected to the control terminal of the first output sub-circuit, a first terminal of the display output transistor being electrically connected to the compensation common voltage signal terminal, a second terminal of the display output transistor being electrically connected to the common voltage output terminal, a first terminal of the storage capacitor being electrically connected to the first node, and a second terminal of the storage capacitor being electrically connected to the output terminal of the first output sub-circuit.

4. The common voltage compensation circuit unit according to claim 1, wherein the control sub-circuit comprises a first control transistor, a second control transistor, and a third control transistor, a control terminal of the first control transistor being electrically connected to the first control terminal of the control sub-circuit, a first terminal of the first control transistor being electrically connected to the second input terminal of the control sub-circuit, and a second terminal of the first control transistor being electrically connected to the first output terminal of the control sub-circuit;

a control terminal of the second control transistor being electrically connected to the first input terminal of the control sub-circuit, and a second terminal of the second control transistor being electrically connected to the second control terminal of a control sub-circuit connection;

a control terminal of the third control transistor being electrically connected to the second control terminal of the control sub-circuit, a first terminal of the third control transistor being electrically connected to the first input terminal of the control sub-circuit, and a second terminal of the third control transistor being electrically connected to the second output terminal of the control sub-circuit.

5. The common voltage compensation circuit unit according to claim 1, wherein the reset sub-circuit comprises a first reset transistor, a second reset transistor, a third reset transistor, and a fourth reset transistor, a control terminal of the first reset transistor being electrically connected to the second control terminal of the reset sub-circuit, a first terminal of the first reset transistor being electrically connected to the input terminal of the reset sub-circuit, and a second terminal of the first reset transistor being electrically connected to the first output terminal of the reset sub-circuit;

a control terminal of the second reset transistor being electrically connected to the first control terminal of the reset sub-circuit, a first terminal of the second reset transistor being electrically connected to the input terminal of the reset sub-circuit, and a second terminal of the second reset transistor being electrically connected to the first output terminal of the reset sub-circuit;

a control terminal of the third reset transistor being electrically connected to the third control terminal of the reset sub-circuit, a first terminal of the third reset transistor being electrically connected to the input terminal of the reset sub-circuit, and a second terminal of the third reset transistor being electrically connected to the second output terminal of the reset sub-circuit;

a control terminal of the fourth reset transistor being electrically connected to the third control terminal of the reset sub-circuit, a first terminal of the fourth reset transistor being electrically connected to the input terminal of the reset sub-circuit, and a second terminal of the fourth reset transistor being electrically connected to the third output terminal of the reset sub-circuit.

6. The common voltage compensation circuit unit according to claim 1, wherein the second output sub-circuit comprises a first reset output transistor, a second reset output transistor, and a third reset output transistor, a control terminal of the first reset output transistor being electrically connected to the second control terminal of the second output sub-circuit, a first terminal of the first reset output transistor being electrically connected to the input terminal of the second output sub-circuit, and a second terminal of the first reset output transistor being electrically connected to the output terminal of the second output sub-circuit;

a control terminal of the second reset output transistor being electrically connected to the third control terminal of the second output sub-circuit, a first terminal of the second reset output transistor being electrically connected to the input terminal of the second output sub-circuit, and a second terminal of the second reset output transistor being electrically connected to the output terminal of the second output sub-circuit;

a control terminal of the third reset output transistor being electrically connected to the first control terminal of the second output sub-circuit, a first terminal of the third reset output transistor being electrically connected to the input terminal of the second output sub-circuit, and a second terminal of the third reset output transistor being electrically connected to the output terminal of the second output sub-circuit.

7. A display panel, comprising a plurality of cascaded common voltage compensation circuit units, each of the common voltage compensation circuit units comprising:

a trigger signal terminal, a common voltage output terminal, a design common voltage signal terminal, a power signal terminal, a compensation common voltage signal terminal, a reset signal terminal, a clock signal terminal, a trigger signal input sub-circuit, a first output sub-circuit, a control sub-circuit, a second output sub-circuit, and a reset sub-circuit, wherein:

an input terminal of the trigger signal input sub-circuit is electrically connected to the trigger signal terminal, an output terminal of the trigger signal input sub-circuit is electrically connected to a first node, and the trigger signal input sub-circuit is configured to, in response to receiving a first level signal at the input terminal of the trigger signal input sub-circuit, bring the input terminal of the trigger signal input sub-circuit into conduction with the output terminal of the trigger signal input sub-circuit;

an input terminal of the first output sub-circuit is electrically connected to the compensation common voltage signal terminal, a control terminal of the first output sub-circuit is electrically connected to the first node, an output terminal of the first output sub-circuit is electrically connected to the common voltage output terminal, and the first output sub-circuit is configured to, in response to receiving a third level signal at the control terminal of the first output sub-circuit, bring the input terminal of the first output sub-circuit into conduction with the output terminal of the first output sub-circuit, wherein an absolute value of the third level signal is greater than or equal to an absolute value of the first level signal, and the third level signal and the first level signal have a same polarity;

a first control terminal of the control sub-circuit is electrically connected to the clock signal terminal, a second control terminal of the control sub-circuit is electrically connected to a second output terminal of the reset sub-circuit, a first input terminal of the control sub-circuit is electrically connected to the clock signal terminal, a second input terminal of the control sub-circuit is electrically connected to the trigger signal terminal, a first output terminal of the control sub-circuit is electrically connected to the first node, a second output terminal of the control sub-circuit is electrically connected to a second node, and the control sub-circuit is configured to, in response to receiving the first level signal at the first control terminal of the control sub-circuit, bring the second input terminal of the control sub-circuit into conduction with the first output terminal of the control sub-circuit, and in response to receiving a second level signal at the second control terminal of the control sub-circuit, disconnect the first input terminal of the control sub-circuit from the second output terminal of the control sub-circuit;

a first control terminal of the second output sub-circuit is electrically connected to the second node, a second control terminal of the second output sub-circuit is electrically connected to the reset signal terminal, a third control terminal of the second output sub-circuit is electrically connected to the clock signal terminal, an input terminal of the second output sub-circuit is electrically connected to the design common voltage signal terminal, an output terminal of the second output sub-circuit is electrically connected to the common voltage output terminal, and the second output sub-circuit is configured to, in response to receiving the first level signal at at least one of the first control terminal, the second control terminal, or the third control terminal of the second output sub-circuit, bring the input terminal of the second output sub-circuit into conduction with the output terminal of the second output sub-circuit;

a first control terminal of the reset sub-circuit is electrically connected to the reset signal terminal, a second control terminal of the reset sub-circuit is electrically connected to the second node, a third control terminal of the reset sub-circuit is electrically connected to the first node, an input terminal of the reset sub-circuit is electrically connected to the power signal terminal, a first output terminal of the reset sub-circuit is electrically connected to the first node, a third output terminal of the reset sub-circuit is electrically connected to the second node, and the reset sub-circuit is configured to, in response to receiving the first level signal at at least one of the first control terminal or the second control terminal of the reset sub-circuit, bring the input terminal of the reset sub-circuit into conduction with the first output terminal of the reset sub-circuit, and in response to receiving the first level signal at the third control terminal of the reset sub-circuit, bring the input terminal of the reset sub-circuit into conduction with the second output terminal and the third output terminal of the reset sub-circuit;

a plurality of gate lines, a plurality of common electrode lines, a first clock signal line, a second clock signal line, a power signal line, a design common voltage signal line, and a compensation common voltage signal line, wherein:

the common voltage output terminal of each of the common voltage compensation circuit units is electrically connected to a corresponding one of the common electrode lines, the trigger signal terminal of each of the common voltage compensation circuit units is electrically connected to a corresponding one of the gate lines, the reset signal terminal of each of the common voltage compensation circuit units is electrically connected to another corresponding one of the gate lines, the power signal terminal of each of the common voltage compensation circuit units is electrically connected to the power signal line, the design common voltage signal terminal of each of the common voltage compensation circuit units is electrically connected to the design common voltage signal line, and the compensation common voltage signal terminal of each of the common voltage compensation circuit units is electrically connected to the compensation common voltage signal line;

in a case that one of the common voltage compensation circuit units corresponds to an odd-row common electrode line, the clock signal terminal of the common voltage compensation circuit unit is electrically connected to the first clock signal line; in a case that one of the common voltage compensation circuit units corresponds to an even-row common electrode line, the clock signal terminal of the common voltage compensation circuit unit is electrically connected to the second clock signal line;

the compensation common voltage signal line is electrically connected to a common voltage generating chip configured to provide a design common voltage signal to the compensation common voltage signal line in response to the first clock signal line or the second clock signal line connected to the clock signal terminal of the common voltage compensation circuit unit providing the first level signal, and provide a compensation common voltage signal to the compensation common voltage signal line in response to the first clock signal line or the second clock signal line connected to the clock signal terminal of the common voltage compensation circuit unit providing the second level signal.

8. The display panel according to claim 7, comprising multiple rows of pixel units, each row of pixel units comprising a plurality of pixel units, the multiple rows of pixel units being in one-to-one correspondence with multiple rows of common electrodes, wherein the common voltage generating chip is configured to calculate the compensation common voltage signal according to Formula (1) and Formula (2):

$$ComN - Com'N = \Delta Vp \quad (1)$$

$$\Delta Vp = \frac{(Vgh - Vg1) * Cgd}{Cgd + Cs + C1c} \quad (2)$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the N-th row of pixel units;

Cs is a storage capacitance of the one pixel unit; and

Clc is a liquid crystal capacitance of the one pixel unit.

9. The display panel according to claim 7, wherein the common electrode lines are in one-to-one correspondence with the common voltage compensation circuit units.

10. A display device comprising the display panel according to claim 7.

11. A method of utilizing the common voltage compensation circuit unit according to claim 1 to perform common voltage compensation for a display panel, the method comprising:

performing an input phase in which the first level signal is input from the trigger signal terminal, the second level signal is input from the clock signal terminal, the second level signal is input from the reset signal terminal, and a design common voltage signal is input from the compensation common voltage signal terminal;

performing a display output phase in which the second level signal is input from the trigger signal terminal, the second level signal is input from the clock signal terminal, and a compensation common voltage signal is input from the compensation common voltage signal terminal; and performing a reset phase in which the first level signal is input from the clock signal terminal, the second level signal is input from the trigger signal terminal, the first level signal is input from the reset signal terminal, and the design common voltage signal is input from the design common voltage signal terminal.

12. The method according to claim 11, further comprising calculating the compensation common voltage signal according to Formula (1) and Formula (2):

$$ComN - Com'N = \Delta Vp \quad (1)$$

$$\Delta Vp = \frac{(Vgh - Vg1) * Cgd}{Cgd + Cs + C1c} \quad (2)$$

wherein ComN is a voltage value of the design common voltage signal for an N-th row of pixel units corresponding to the common voltage compensation circuit unit;

Com'N is a voltage value of a compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the pixel units of the N-th row;

Cs is a storage capacitance of the one pixel unit; and

Clc is a liquid crystal capacitance of the one pixel unit.

13. The common voltage compensation circuit unit according to claim 1, wherein the trigger signal input sub-circuit comprises a trigger input transistor, a first terminal of the trigger input transistor being electrically connected to the input terminal of the trigger signal input sub-circuit, and a second terminal of the trigger input transistor being electrically connected to the output terminal of the trigger signal input sub-circuit, wherein the first output sub-circuit comprises a display output transistor and a storage capacitor, a control terminal of the display output transistor being electrically connected to the control terminal of the first output sub-circuit, a first terminal of the display output transistor being electrically connected to the compensation common voltage signal terminal, a second terminal of the display output transistor being electrically connected to the common voltage output terminal, a first terminal of the storage capacitor being electrically connected to the first node, and a second terminal of the storage capacitor being electrically connected to the output terminal of the first output sub-circuit, wherein the control sub-circuit comprises a first control transistor, a second control transistor, and a third control transistor, a control terminal of the first control transistor being electrically connected to the first control terminal of the control sub-circuit, a first terminal of the first control transistor being electrically connected to the second input terminal of the control sub-circuit, and a second terminal of the first control transistor being electrically connected to the first output terminal of the control sub-circuit; a control terminal of the second control transistor being electrically connected to the first input terminal of the control sub-circuit, and a second terminal of the second control transistor being electrically connected to the second control terminal of a control sub-circuit connection; a control terminal of the third control transistor being electrically connected to the second control terminal of the control sub-circuit, a first terminal of the third control transistor being electrically connected to the first input terminal of the control sub-circuit, and a second terminal of the third control transistor being electrically connected to the second output terminal of the control sub-circuit, wherein the reset sub-circuit comprises a first reset transistor, a second reset transistor, a third reset transistor, and a fourth reset transistor, a control terminal of the first reset transistor being electrically connected to the second control terminal of the reset sub-circuit, a first terminal of the first reset transistor being electrically connected to the input terminal of the reset sub-circuit, and a second terminal of the first reset transistor being electrically connected to the first output terminal of the reset sub-circuit; a control terminal of the second reset transistor being electrically connected to the first control terminal of the reset sub-circuit, a first terminal of the second reset transistor being electrically connected to the input terminal of the reset sub-circuit, and a second terminal of the second reset transistor being electrically connected to the first output terminal of the reset sub-circuit; a control terminal of the third reset transistor being electrically connected to the third control terminal of the reset sub-circuit, a first terminal of the third reset transistor being electrically connected to the input terminal of the reset sub-circuit, and a second terminal of the third reset transistor being electrically connected to the second output terminal of the reset sub-circuit; a control terminal of the fourth reset transistor being electrically connected to the third control terminal of the reset sub-circuit, a first terminal of the fourth reset transistor being electrically connected to the input terminal of the reset sub-circuit, and a second terminal of the fourth reset transistor being electrically connected to the third output terminal of the reset sub-circuit, and wherein the second output sub-circuit comprises a first reset output transistor, a second reset output transistor, and a third reset output transistor, a control terminal of the first reset output transistor being electrically connected to the second control terminal of the second output sub-circuit, a first terminal of the first reset output transistor being electrically connected to the input terminal of the second output sub-circuit, and a second terminal of the first reset output transistor being electrically connected to the output terminal of the second output sub-circuit; a control terminal of the second reset output transistor being electrically connected to the third control terminal of the second output sub-circuit, a first terminal of the second reset output transistor being electrically connected to the input terminal of the second output sub-circuit, and a second terminal of the second reset output transistor being electrically connected to the output terminal of the second output sub-circuit; a control terminal of the third reset output transistor being electrically connected to the first control terminal of the second output sub-circuit, a first terminal of the third reset output transistor being electrically connected to the input terminal of the second output sub-circuit, and a second terminal of the third reset output transistor being electrically connected to the output terminal of the second output sub-circuit.

14. The display panel according to claim 7, wherein the trigger signal input sub-circuit comprises a trigger input transistor, a first terminal of the trigger input transistor being electrically connected to the input terminal of the trigger signal input sub-circuit, and a second terminal of the trigger input transistor being electrically connected to the output terminal of the trigger signal input sub-circuit.

15. The display panel according to claim 7, wherein the first output sub-circuit comprises a display output transistor and a storage capacitor, a control terminal of the display output transistor being electrically connected to the control terminal of the first output sub-circuit, a first terminal of the display output transistor being electrically connected to the compensation common voltage signal terminal, a second terminal of the display output transistor being electrically connected to the common voltage output terminal, a first terminal of the storage capacitor being electrically connected to the first node, and a second terminal of the storage capacitor being electrically connected to the output terminal of the first output sub-circuit.

16. The display panel according to claim 7, wherein the control sub-circuit comprises a first control transistor, a second control transistor, and a third control transistor, a control terminal of the first control transistor being electrically connected to the first control terminal of the control sub-circuit, a first terminal of the first control transistor being electrically connected to the second input terminal of the control sub-circuit, and a second terminal of the first control transistor being electrically connected to the first output terminal of the control sub-circuit;

a control terminal of the second control transistor being electrically connected to the first input terminal of the control sub-circuit, and a second terminal of the second control transistor being electrically connected to the second control terminal of the control sub-circuit connection;

a control terminal of the third control transistor being electrically connected to the second control terminal of the control sub-circuit, a first terminal of the third control transistor being electrically connected to the first input terminal of the control sub-circuit, and a second terminal of the third control transistor being electrically connected to the second output terminal of the control sub-circuit.

17. The display panel according to claim 7, wherein the reset sub-circuit comprises a first reset transistor, a second reset transistor, a third reset transistor, and a fourth reset transistor, a control terminal of the first reset transistor being electrically connected to the second control terminal of the reset sub-circuit, a first terminal of the first reset transistor being electrically connected to the input terminal of the reset sub-circuit, and a second terminal of the first reset transistor being electrically connected to the first output terminal of the reset sub-circuit;

a control terminal of the second reset transistor being electrically connected to the first control terminal of the reset sub-circuit, a first terminal of the second reset transistor being electrically connected to the input terminal of the reset sub-circuit, and a second terminal of the second reset transistor being electrically connected to the first output terminal of the reset sub-circuit;

a control terminal of the third reset transistor being electrically connected to the third control terminal of the reset sub-circuit, a first terminal of the third reset transistor being electrically connected to the input terminal of the reset sub-circuit, and a second terminal of the third reset transistor being electrically connected to the second output terminal of the reset sub-circuit;

a control terminal of the fourth reset transistor being electrically connected to the third control terminal of the reset sub-circuit, a first terminal of the fourth reset transistor being electrically connected to the input terminal of the reset sub-circuit, and a second terminal of the fourth reset transistor being electrically connected to the third output terminal of the reset sub-circuit.

18. The display panel according to claim 7, wherein the second output sub-circuit comprises a first reset output transistor, a second reset output transistor, and a third reset output transistor, a control terminal of the first reset output transistor being electrically connected to the second control terminal of the second output sub-circuit, a first terminal of the first reset output transistor being electrically connected to the input terminal of the second output sub-circuit, and a second terminal of the first reset output transistor being electrically connected to the output terminal of the second output sub-circuit;

a control terminal of the second reset output transistor being electrically connected to the third control terminal of the second output sub-circuit, a first terminal of the second reset output transistor being electrically connected to the input terminal of the second output sub-circuit, and a second terminal of the second reset output transistor being electrically connected to the output terminal of the second output sub-circuit;

a control terminal of the third reset output transistor being electrically connected to the first control terminal of the second output sub-circuit, a first terminal of the third reset output transistor being electrically connected to the input terminal of the second output sub-circuit, and a second terminal of the third reset output transistor being electrically connected to the output terminal of the second output sub-circuit.

19. The display device according to claim 10, wherein the display panel comprises multiple rows of pixel units, each row of pixel units comprising a plurality of pixel units, the multiple rows of pixel units being in one-to-one correspondence with multiple rows of common electrodes, wherein the common voltage generating chip is configured to calculate the compensation common voltage signal according to Formula (1) and Formula (2):

$$ComN - Com'N = \Delta Vp \tag{1}$$

$$\Delta Vp = \frac{(Vgh - Vg1) * Cgd}{Cgd + Cs + C1c} \tag{2}$$

where ComN is a voltage value of the design common voltage signal for an N-th row of pixel units corresponding to the common voltage compensation circuit unit;

Com'N is a voltage value of the compensation common voltage signal for the N-th row of pixel units;

Vgh is a voltage value of the first level signal;

Vgl is a voltage value of the second level signal;

Cgd is a capacitance between a gate and a drain of a thin film transistor of one pixel unit among the N-th row of pixel units;

Cs is a storage capacitance of the one pixel unit; and

Clc is a liquid crystal capacitance of the one pixel unit.

20. The display device according to claim 10, wherein the common electrode lines are in one-to-one correspondence with the common voltage compensation circuit units.

* * * * *